Figure 1:
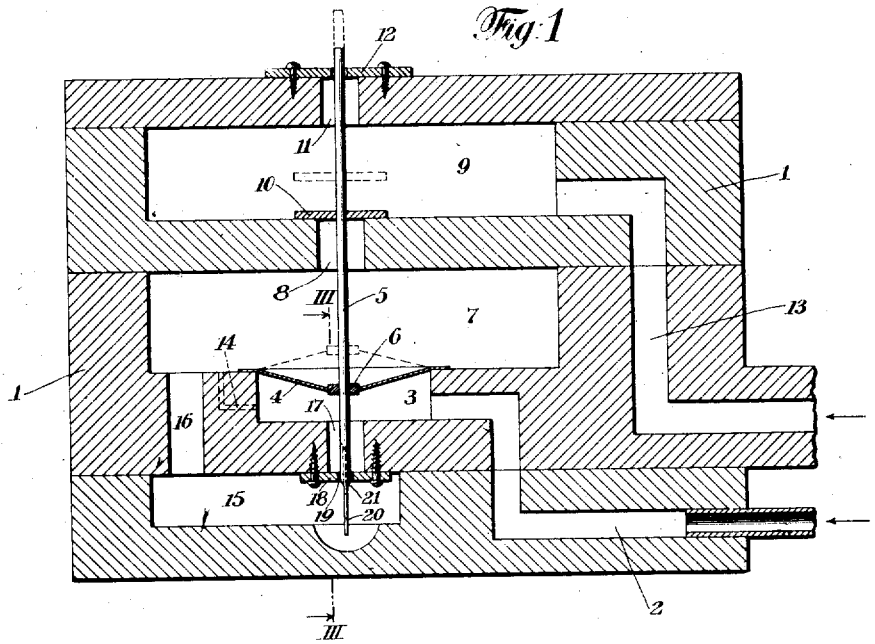

J. SCHWERTNER.

PNEUMATIC APPARATUS.

APPLICATION FILED AUG. 17, 1911.

Reissued Mar. 12, 1912. 13,384.

Witnesses:
Geo. M. Adams
John O. Sampler

Inventor
Joseph Schwertner
By his Attorneys
Kenyon & Kenyon

UNITED STATES PATENT OFFICE.

JOSEPH SCHWERTNER, OF NEW YORK, N. Y., ASSIGNOR OF ONE-THIRD TO JOHN ASPINWALL, OF NEWBURGH, NEW YORK, AND ONE-THIRD TO LEOPOLD F. A. H. HEERWAGEN, OF HASBROUCK HEIGHTS, NEW JERSEY.

PNEUMATIC APPARATUS.

13,384. Specification of Reissued Letters Patent. Reissued Mar. 12, 1912.

Original No. 993,415, dated May 30, 1911, Serial No. 548,815. Application for reissue filed August 17, 1911. Serial No. 644,921.

*To all whom it may concern:*

Be it known that I, JOSEPH SCHWERTNER, a citizen of the United States, and a resident of New York, county of New York, and State of New York, have invented certain new and useful Improvements in Pneumatic Apparatus, of which the following is a specification.

My invention relates to improvements in pneumatic apparatus and more especially to pneumatics such as are used in automatic playing musical instruments to control the operation thereof.

In self playing pianos it is customary to provide a pneumatic device for operating each note and a tracker board and sheet with apertures corresponding to the various notes for controlling the operation thereof. Between the tracker and operating pneumatics, however, it is usual to place one or more controlling pneumatics for controlling the action of the operating pneumatics responsive to the operation and particular design of the tracker sheet. In most instances these intermediate pneumatics are controlled and operated by means of suction or a partial vacuum produced by suitable bellows. In organs the action is similar except that it is usual to operate the various devices by wind pressure, that is, by blowing action rather than by suction. In both instances, however, it is usual to provide pneumatic arrangements with an operating membrane and with a bleed hole leading to one side of the membrane in order to allow of an equalization of pressure on that side of the membrane when it is desired to close a valve. Great trouble is experienced with these bleed holes, in that they become clogged with dust and dirt, thus preventing them from fulfilling their functions and practically rendering the playing devices useless until the holes are cleaned and properly cleared. This, at best, is a very tedious process, and in many cases is attendant with great difficulties due to the inaccessibility of the parts, the large number of valves and pneumatics, and their complex arrangement.

One object of my invention is to provide means for automatically cleaning and clearing these bleed holes so that the above difficulties and disadvantages are not experienced, and which means will be reliable and efficient in its operation.

A further object of my invention is to provide means which will vary the effective size of the bleed holes so as to render the devices more sensitive while only a minimum of air or other medium will be lost therethrough.

Further objects, features and advantages will more clearly appear from the detailed description given below taken in connection with the accompanying drawing which forms a part of this specification.

Figure 2:
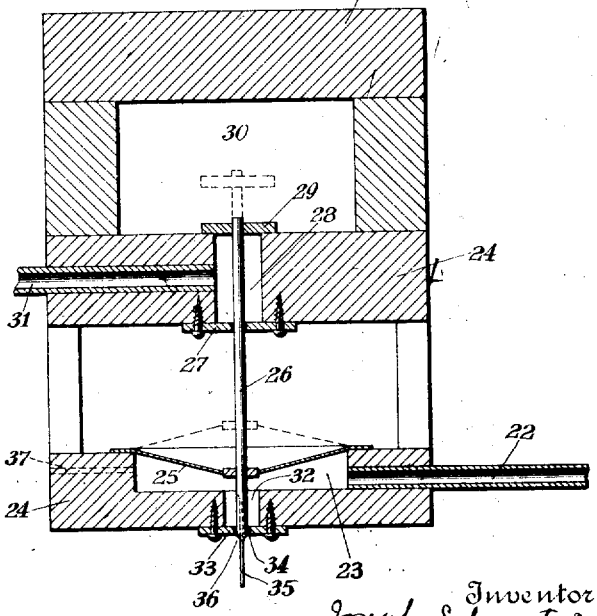
Figure 3:
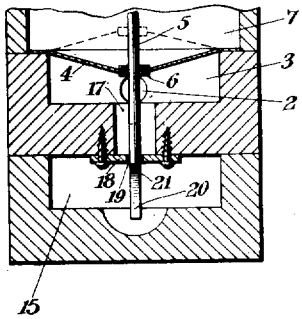

In the drawing, Figure 1 is a vertical section of one form of an intermediate pneumatic valve such as is used in connection with piano players and operated by suction and provided with one form of my improvements; Fig. 2 is a similar view of a valve operated by wind pressure, such as is used in organs and showing a similar form of my improvements; Fig. 3 is a detail section of the parts adjacent the bleed hole taken on the line III—III of Fig. 1.

Referring to Figs. 1 and 3, 1 represents suitable frame work embracing a pneumatic of the class mentioned. 2 designates a duct leading from the tracker which controls the playing of the piano or other instrument. The duct 2 leads to a chamber or space 3 over the top of which is spread a circular membrane 4 of leather or other suitable material. The edges of the membrane 4 are cemented to the framework and in its center it is secured to a spindle 5 by suitable securing means 6. Above the membrane 4 is a chamber or space 7 in which there is produced suction in a well known manner so that the pressure therein will be less than atmospheric. The spindle 5 passes upwardly through an aperture 8 into a chamber 9. Just above the aperture or valve opening 8 and secured to the spindle 5 is a valve closure 10 arranged to close the opening 8 when the spindle is in its lowermost position and arranged to allow the chambers 7 and 9 to be connected by the opening 8 when the valve closure is raised by the spindle 5. The spindle 5 passes upwardly through an opening 11 in the framework and through a hole in a brass plate 12 which covers the opening 11. The plate 12 is secured to the framework and serves as a bearing and guide for the moving spindle 5. From the chamber 9 a duct 13 leads to the operating pneumatic for the corresponding note. At 14 I have shown in dotted lines an old form of bleed hole.

The operation of the parts so far described is as follows: Upon the music sheet opening up the duct 2 to the atmosphere, atmospheric pressure is admitted beneath the membrane 4. Since a constant suction is maintained in the chamber 7 this causes the membrane 4 to rise and with it the valve closure 10. This allows suction to be produced in the chamber 9 and duct 13 so that the corresponding pneumatic is operated. Upon the closing of the duct 2 to the atmosphere by the tracker sheet the air within the chamber 3 is sucked out through the small bleed hole 14, thus causing the membrane 4 and spindle 5 to drop and therewith the valve closure 10, thereby closing the opening 8.

In practice it is found that the bleed hole 14 becomes seriously clogged with dust and dirt which is admitted through the duct 2. I, therefore, omit the bleed hole 14 altogether and provide a chamber 15 below the chamber 3. The chamber 15 is connected with the chamber 7 by a passage 16 and these are so large that dust and dirt will have practically no effect in stopping up the same. Connecting the chambers 15 and 3 is also a similarly large passage 17, but this passage is very nearly closed by a brass plate 18 secured to the framework, the plate 18 being provided with a small hole 19 therein through which the lower end of the spindle 5 is arranged to move up and down when operating. The lower end of the spindle 5 is reduced or cut away as at 20 and beveled off as at 21. When in its lowermost position the portion 21 is below the plate 18 while when the spindle 5 is in its uppermost position, as shown in dotted lines, the portion 21 is above the plate 18. Thus when the spindle 5 is raised the reduced portion 20 thereof is within the bleed hole 19 and the effective size of the hole is increased or larger than when the spindle is in its lowermost position.

The operation of the arrangement last described is as follows: Whenever the spindle 5 is operated to raise and lower the valve closure 10, the lower end of the spindle 5 works up and down in the bleed hole 19 to keep the same free and clear of dust and dirt, the membrane 4 being withdrawn or drawn downwardly by the suction within the chamber 7 exerting itself through the passage 16, chamber 15, bleed hole 19 and passage 17. By having the spindle 5 beveled or cut away as at 21 so that it varies in cross section at the part where it operates within the bleed hole, it is most efficient for cleaning and yet simple, cheap and easy of construction. The larger portions fairly push the dirt out ahead of them. The above arrangement forms a most simple and effective automatic means for keeping the bleed hole clear, thus obviating one of the most provoking disadvantages encountered in former arrangements. Furthermore, by increasing the effective size of the bleed hole when the valve is opened, the spindle 5 is given a much greater impetus at the start when it is desired to close the valve. In a similar manner when the valve starts to open, the impetus is greater because the effective area of the bleed hole is smaller and less leakage occurs through the bleed hole. That is when the valve starts to open the spindle has a snug fit within the hole 19, except for a most slight leakage, as shown in the drawings. In other words, the bleed hole should have its greatest effective opening when the spindle is raised in order to return the spindle quickly when the duct 2 is closed. If the bleed hole was made smaller when the spindle was raised it would cause the spindle to drop down too slowly and if the bleed hole was closed when the spindle was raised the spindle would never drop back as desired because there would be no way in which to get the air out from beneath the membrane to allow it to drop and unless the spindle would drop the bleed hole would always remain closed. From the above the great advantage of always having the bleed hole open or at least having it open when the spindle is raised and with its greatest effective area when the spindle is raised, will be clearly apparent.

Referring to Fig. 2, I there show a similar arrangement applied to a valve of the wind pressure variety such as it is customary to use in organs both of the manual and automatic type. In this arrangement, wind enters from the tracker under pressure and passes through the duct 22 into the chamber 23 in the frame 24. The membrane 25 is thereby forced upwardly, thus moving upwardly the spindle 26 which is secured to it. The spindle 26 passes through a brass plate 27 and up through a passage 28 and has secured to it a valve closure 29 arranged to close the opening 28 when the spindle 26 is in its lowermost position. Above the passage 28 and valve closure 29 is a chamber 30 in which a suitable wind pressure is constantly produced in a well known manner. Upon the raising of the valve closure 29 by the spindle 26 the wind pressure is admitted to the passage 28 and duct 31 from which it passes to a suitable operating pneumatic to operate the note desired.

In order that the air in the chamber 23 may be allowed to escape and allow the spindle 5 to drop and close the valve when the pressure is shut off from the duct 22, a passageway 32 is provided and this passageway is covered by a brass plate 33 having a bleed hole 34 therein, through which the excess air in the chamber is allowed to escape to the atmosphere so that the valve will close. The lower portion of the spindle 26 passes through the bleed hole 34 and is reduced at 35 and beveled at 36 to perform substantially the same functions as described with respect to Figs. 1 and 3. The bleed opening 34 is large when the valve closure starts to descend thus causing the valve to close more quickly. Likewise when starting upward there is less leakage about the spindle 34, thus causing the valve to open more quickly. Furthermore, the reduction at 35 and bevel at 36 cause the spindle 26 to keep the bleed hole absolutely free from dust and dirt. 37 indicates in dotted lines an old arrangement of bleed hole in this kind of a device and which was of great annoyance for the reasons given.

From the above it will be readily seen that I provide means rigid with the spindle (shown in this particular instance as the lower portion of the spindle) which has one or more surfaces at an angle to the line of movement of the spindle. These surfaces are shown as the tapered surfaces 21 and 36 in the drawings and they push the dirt or other foreign matter out of the bleed hole when the pneumatic action is operated. These surfaces need not be at the particular angle shown but should be at a large enough angle to the line of movement of the spindle so that they will push the dirt, etc., from the bleed hole. If the spindle is sufficiently well guided in its movement, the end or cut away portion 20 of the spindle may be omitted and the surface or surfaces 21, 36 will still push the dirt, etc., from the bleed hole. As shown in dotted lines in Figs. 1 and 2, the surfaces 21, 36 come out of the bleed hole when the valve is operated in order that they may be in a better position to force the dirt, etc., from the bleed hole when the action returns to its normal position.

My improvements may be applied to other valves than those of the kind described wherever the nature of the case will permit. Furthermore, many modifications and changes may be made in the arrangements shown without departing from the spirit and scope of my invention and I, therefore, do not desire to be limited to the details shown and described except as clearly specified in the appended claims.

Having fully and clearly described my improvements, what I claim as new and desire to secure by Letters Patent of the United States, is:

1. A device of the class described, provided with a bleed hole, a valve closure and a movable member controlling the valve closure, and means operating to keep the bleed hole clear controlled by said movable member, said means being also arranged to increase the effective cross section of the bleed hole when the valve is opened.

2. A device of the class described, provided with an operating spindle and membrane and a bleed hole leading to one side of the membrane, said spindle being arranged to operate within the bleed hole to keep the same clear, said spindle being also constructed to vary the effective size of the bleed hole as the device is operated.

3. A device of the class described, provided with an operating spindle and membrane and a bleed hole leading to one side of the membrane, said spindle being arranged to operate within the bleed hole to keep the same clear, said spindle being reduced in cross section adjacent the bleed hole to increase the effective size of the bleed hole when the device is opened.

4. A device of the class described, provided with an operating membrane and spindle, and a suitable framework having a suitable space above and below the membrane and a bleed hole leading to the space below the membrane, said bleed hole being formed in a metallic plate, said spindle being arranged to move up and down in said bleed hole to keep the same clear, and said spindle being reduced in cross section adjacent the bleed hole to increase the effective size of the bleed hole when the device is opened.

5. In a device of the class described, an operating membrane, said device being provided with a bleed hole leading to one side of said membrane and a spindle having portions thereof operating in said bleed hole to keep the same clear, said portions being of different cross section and the spindle being always in said bleed hole during the operation of the spindle.

6. In a device of the class described, an operating membrane, said device being provided with a bleed hole leading to one side of said membrane, and a spindle operating in said bleed hole to keep the same clear, said spindle having portions of different cross section, both of said portions being arranged to operate within said bleed hole.

7. In a device of the class described, an operating membrane, said device being provided with a bleed hole leading to one side of said membrane, and a spindle operating in said bleed hole to keep the same clear, said spindle being tapered at the part where it operates within the bleed hole.

8. In a device of the class described, a pneumatic action provided with a bleed hole, and a spindle controlled by said action and operating within said bleed hole, said spindle being varied in cross section at the part operating within the bleed to clean the bleed hole.

9. In a device of the class described, a pneumatic action provided with a bleed hole and a spindle controlled by said action and operating within said bleed hole, said spindle being constructed to increase the effective cross section of the bleed hole when the valve is operated.

10. In a device of the class described, a pneumatic action provided with a bleed hole and a spindle controlled by said action, said spindle being constructed to increase the effective cross-section of the bleed hole when the valve is operated to cause the action to more quickly return to its normal position.

11. The combination of a tracker board and tracker sheet with their apertures and operating mechanism controlled thereby, including a pneumatic action having a bleed hole and means for cleaning the bleed hole and increasing the effective cross-section of the bleed hole when the action is operated when an aperture in the tracker sheet registers with an aperture in the tracker board, said means embracing a spindle of varied cross-section operating in the bleed hole and controlled by the operating mechanism.

12. In a device of the class described, a pneumatic action, provided with a bleed hole and means for increasing the effective cross-section of said bleed hole when the action is operated pneumatically.

13. In a device of the class described a pneumatic action provided with a bleed hole, and a spindle controlled by said action and operating within said bleed hole, said spindle being reduced in cross-section at the part operating within the bleed to clean the bleed hole.

14. In a device of the class described, a pneumatic action provided with a bleed hole and a spindle controlled by said action, said spindle being constructed to increase the effective cross section of the bleed hole when the valve is operated, and to have a snug fit in the bleed hole when the valve is in the normal position except for slight leakage.

15. In a device of the class described, a pneumatic action provided with a bleed hole and an operating spindle and means rigid with the spindle arranged to push foreign matter out of said bleed hole.

16. In a device of the class described, a pneumatic action provided with a bleed hole and an operating spindle and means rigid with the spindle and having a surface at an angle to the movement of the spindle for pushing foreign matter out of the bleed hole.

17. In a device of the class described, a pneumatic action provided with a bleed hole and an operating spindle and means rigid with the spindle and having a surface which pushes dirt or foreign matter out of the bleed hole when the action is operated, said surface being constructed so that it comes out of the bleed hole when the action is operated.

18. In a device of the class described, a pneumatic action provided with a bleed hole and an operating spindle and means rigid with the spindle and having a surface at an angle to the movement of the spindle for pushing foreign matter out of the bleed hole, said surface being constructed so that it comes out of the bleed hole when the action is operated.

19. In a device of the class described, a pneumatic action having a bleed hole and an operating spindle, said spindle having a surface thereon at an angle to the line of movement of the spindle for pushing dirt and the like out of the bleed hole.

20. In a device of the class described, a pneumatic action having a bleed hole and an operating spindle, said spindle having a surface thereon at an angle to the line of movement of the spindle for pushing dirt and the like out of the bleed hole, said surface being arranged so that it comes out of the bleed hole when the action is operated.

21. A device of the class described provided with an operating membrane or the like, a bleed hole, and a slidably mounted cleaning member for said bleed hole, said member being moved by said membrane or the like and having a surface thereon at an angle to its line of movement to push dirt out of the bleed hole.

22. A device of the class described provided with an operating membrane or the like, a bleed hole therefor, a cleaning member for said bleed hole moved by said membrane, said member being provided with a surface at an angle to its line of movement to push dirt out of the bleed hole, and guiding means through which said member slides to keep it in alinement.

23. A device of the class described provided with an operating membrane or the like, a bleed hole, a cleaning member for the bleed hole moved by said membrane or the like, said member having a surface thereon at an angle to its line of movement to push dirt out of the bleed hole, and said member being always in said bleed hole during the operation of the membrane.

24. A device of the class described provided with an operating membrane or the like, a bleed hole and a slidably mounted cleaning member operating in said bleed hole, said member being moved by said membrane or the like and arranged to increase the effective cross section of the bleed hole when the membrane is pneumatically operated.

25. A pneumatic device of the class described provided with a bleed hole through which air is adapted to be sucked, and a slidably mounted member operated by the device and operating snugly in said hole, said member having a surface at an angle to its line of movement, and said surface being arranged to move entirely through said hole from one side to the other side of said hole.

26. A valve device provided with a hole through which air is adapted to be sucked, and a slidably mounted cleaning member operated by the device and operating in said hole, said member having a surface at an angle to its line of movement for pushing dirt out of the bleed hole, and said surface being arranged to move in and out of said hole, and said member being guided by said hole.

In testimony whereof I have signed my name to this specification in the presence of two subscribing witnesses.

JOSEPH SCHWERTNER.

Witnesses:
GORHAM CROSBY,
EDWIN SEGER.